(12) United States Patent
Sandy

(10) Patent No.: US 9,380,258 B2
(45) Date of Patent: Jun. 28, 2016

(54) CLOTHING ACCESSORY

(71) Applicant: Matt Sandy, Elmsford, NY (US)

(72) Inventor: Matt Sandy, Elmsford, NY (US)

(*) Notice: Subject to any disclaimer, the term of this patent is extended or adjusted under 35 U.S.C. 154(b) by 0 days.

(21) Appl. No.: 14/120,734

(22) Filed: Jun. 23, 2014

(65) Prior Publication Data

US 2015/0229874 A1    Aug. 13, 2015

Related U.S. Application Data

(63) Continuation-in-part of application No. 13/999,304, filed on Feb. 10, 2014.

(51) Int. Cl.
G03B 17/56 (2006.01)
H04N 5/77 (2006.01)
H04N 1/00 (2006.01)

(52) U.S. Cl.
CPC .............. *H04N 5/772* (2013.01); *G03B 17/56* (2013.01); *H04N 1/00204* (2013.01); *H04N 1/00307* (2013.01); *H04N 5/77* (2013.01)

(58) Field of Classification Search
None
See application file for complete search history.

(56) References Cited

U.S. PATENT DOCUMENTS

| | | | | |
|---|---|---|---|---|
| 2014/0072270 A1* | 3/2014 | Goldberg | ................. | H04N 9/87 386/223 |
| 2014/0092299 A1* | 4/2014 | Phillips | ................. | H04N 5/2252 348/376 |
| 2014/0270689 A1* | 9/2014 | Chau | ................. | H04N 5/23245 386/227 |

* cited by examiner

*Primary Examiner* — Eileen Adams

(57) ABSTRACT

A clothing accessory has at least one element of clothing accessory wearable by a user, and a recording camera associated with the element of clothing accessory and carrying out a recording process while being associated with the element of clothing accessory, said recording camera including a touch sensor for tapping to perform photo or video recording, and said recording camera operating wirelessly with remote controlling devices for wireless data transfer, controlling and previewing recordings.

7 Claims, 7 Drawing Sheets

CLOTHING ACCESSORY

BACKGROUND OF THE INVENTION

The present invention relates to a clothing accessory wearable by users on various occasions or attachable to other objects.

Clothing accessories, such as brooches, pins, and neck wearable medallions, are widely known and worn by users for the major purposes of covering parts of clothes. It is believed however that it would be advisable to construct these accessories in such a way that, in addition to their main function of covering clothes, they can also perform other different functions which are not related to the wearing function only, but carry out other actions which can be important in lives of people.

SUMMARY OF THE INVENTION

Accordingly, it is an object of the present invention to provide a clothing accessory which is a further improvement of the existing clothing accessories.

In keeping with these objects and with others which will become apparent hereinafter one feature of the present invention resides, briefly stated, in a clothing accessory which has at least one element of a clothing accessory, and a recording camera associated with said element of clothing accessory that can carry out a recording process while being associated with said element of clothing accessory.

In accordance with a further feature of the present invention, the recording camera is constructed to be arranged on the inner surface of the clothing accessory, and at least one or a plurality of clothing accessory pieces can be provided which are constructed to cover the front side of the camera, leaving unobstructed only an objective or a recording window of the camera, wherein the clothing accessory cover pieces can have different designs.

Still a further feature of the present invention is that the recording camera is constructed to carry out photography and videography, as well automated photography, for example, from 1 to 120 second delay with and without audio recording, in addition to video recording to record during a certain time or over a certain number of periods. In addition, the camera is constructed to include a touch sensor to allow a user to tap the camera to perform photography and videography. These functions can be instructed by the software applications on a wireless remotely operating device, for example on a cellphone, a smartphone and the like.

A further feature of the present invention resides in that the recording camera is provided with a motion detecting element and is activated for recording when the motion detecting element detects a motion in a vicinity of the camera and therefore in the vicinity of a person who wears the clothing accessory.

Still a further feature of the present invention is that the recording camera is constructed to make a plurality of photos and/or videos, and has an activating member provided on the camera when the latter is supported by the clothing accessory and activated by a user to make the photos and/or videos.

A further feature of the present invention is that the camera is constructed as a wirelessly operated camera, and a remotely operating device is provided for operating the wireless camera, and such remotely operating device can include a cellphone, smartphone, tablet and the like which can preview in real time with a software application what the camera is viewing and/or recording.

In accordance with a further feature of the present invention, the wireless camera and/or the remotely operating device are constructed so that the photos, video images and/or audio messages can be transferred wirelessly from the wireless camera to the remotely operating device, which can include a cellphone, smartphone, a table and the like, and thereby viewed, stored or transferred elsewhere on the remotely operating device.

In accordance with another feature of the present invention, the recording camera can be constructed to record photos during the video recording mode enabled by a wireless control device, for example by the software applications of a smartphone and the like.

The novel features of the present invention are set forth in particular in the appended claims.

The invention itself, however, both as to its construction and its manner of operation will be best understood from the following description of the preferred embodiments, which is accompanied by the following drawings.

DESCRIPTION OF THE PREFERRED EMBODIMENTS

Figure 2:
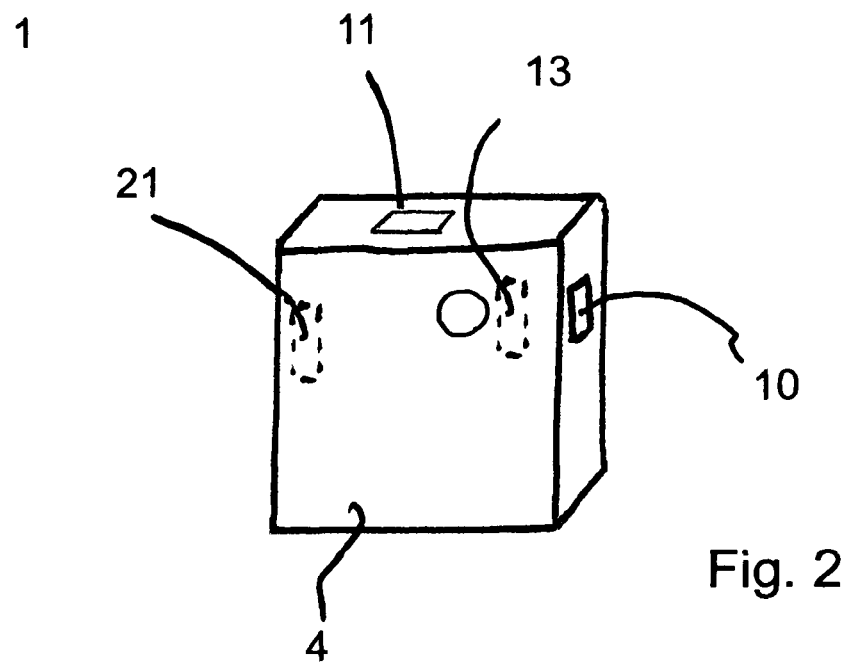
FIG. 2 is a perspective view of the recording camera in accordance with the present invention.
Figure 3:
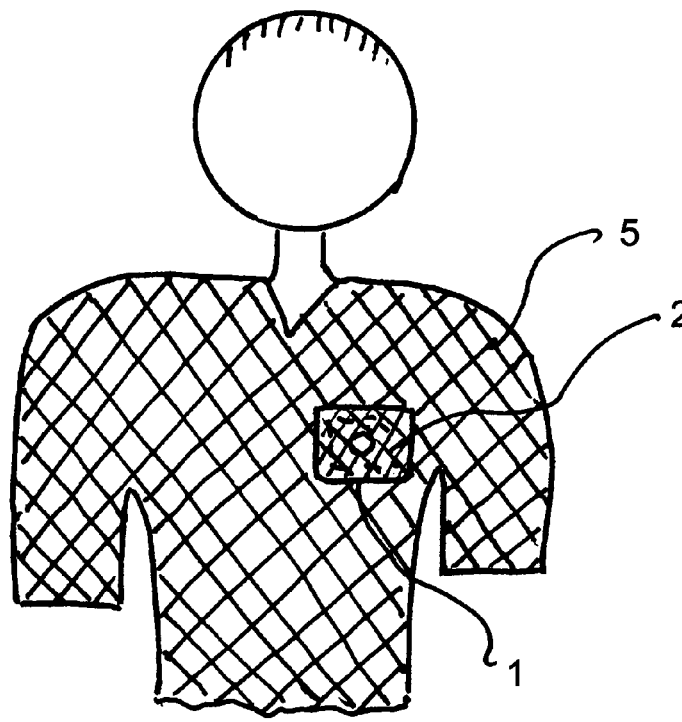
FIGS. 3 and 4 are a front view and a side view of the clothing accessory in accordance with a further embodiment of the invention.
Figure 4:
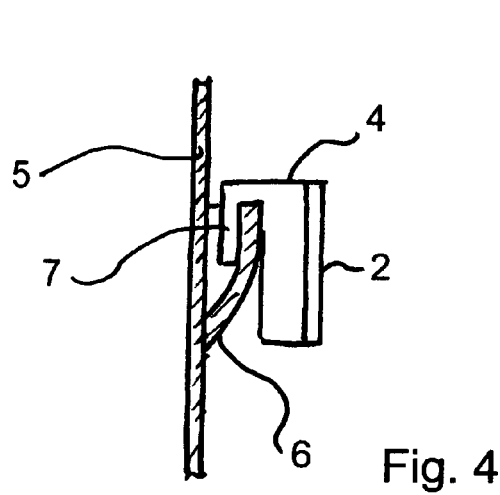
Figure 5:
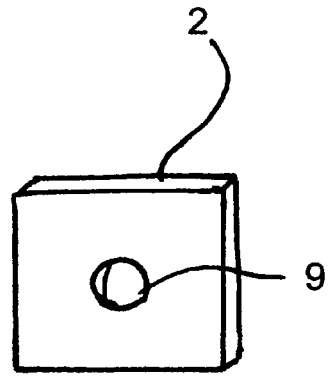
FIG. 5 is a view showing the recording camera with a clothing accessory cover piece in accordance with the invention.

A clothing accessory in accordance with the present invention includes a clothing accessory that is identified as a whole with reference numeral 1. The clothing accessory 1 further has a recording camera built in that is identified as a whole with reference numeral 4. The recording camera 4 that is shown in FIG. 2 is constructed to carry a recording process while being associated with the clothing accessory 1.

Figure 1:
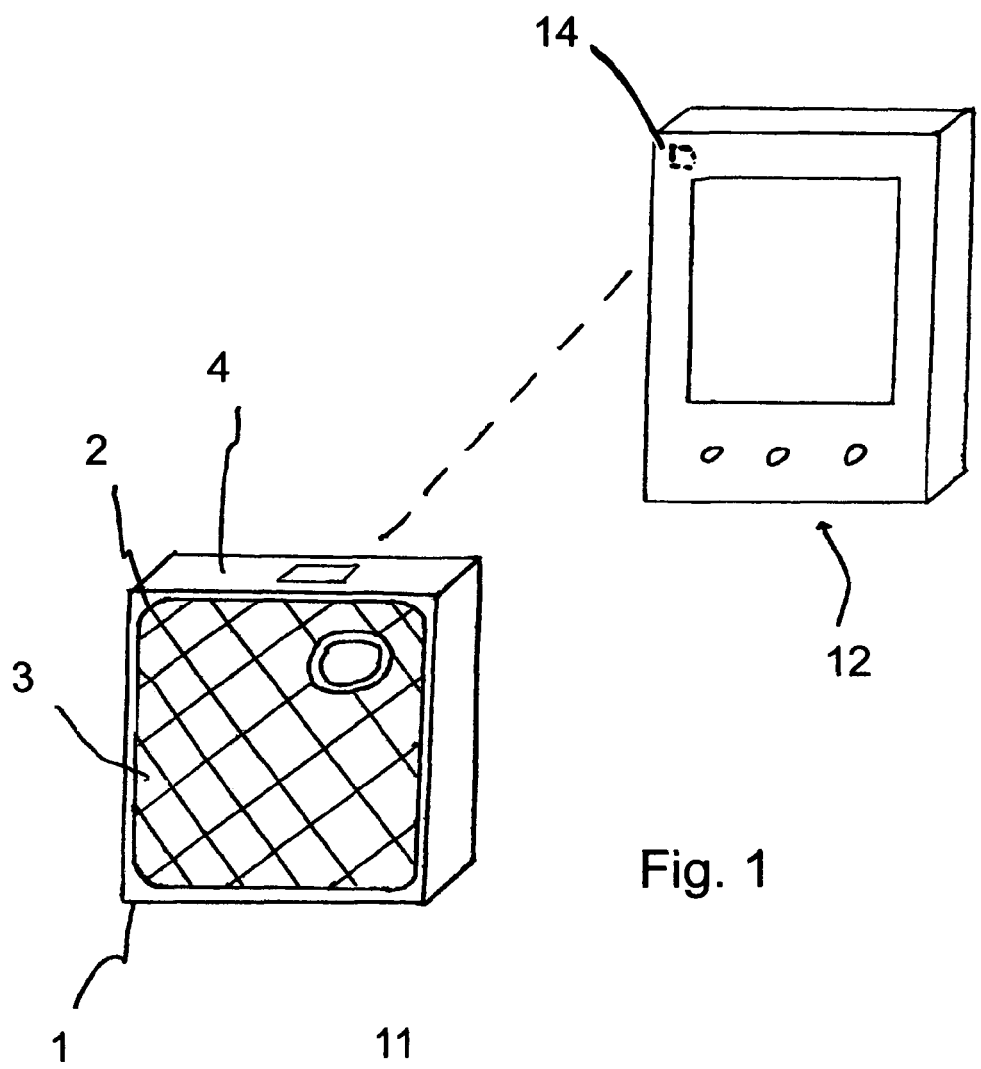
FIG. 1 of the drawings is a view showing the clothing accessory according to the invention, with a clothing accessory cover piece, a recording camera, and a remotely operating control device.

FIG. 1 shows that the clothing accessory 1 can be provided with at least one cover piece 2, attachable in any number of ways—adhesive, clipped on, wrapped around, etc —to the recording camera 4. The cover piece 2 can be of any shape, color, size, and/or material 3.

Figure 6:
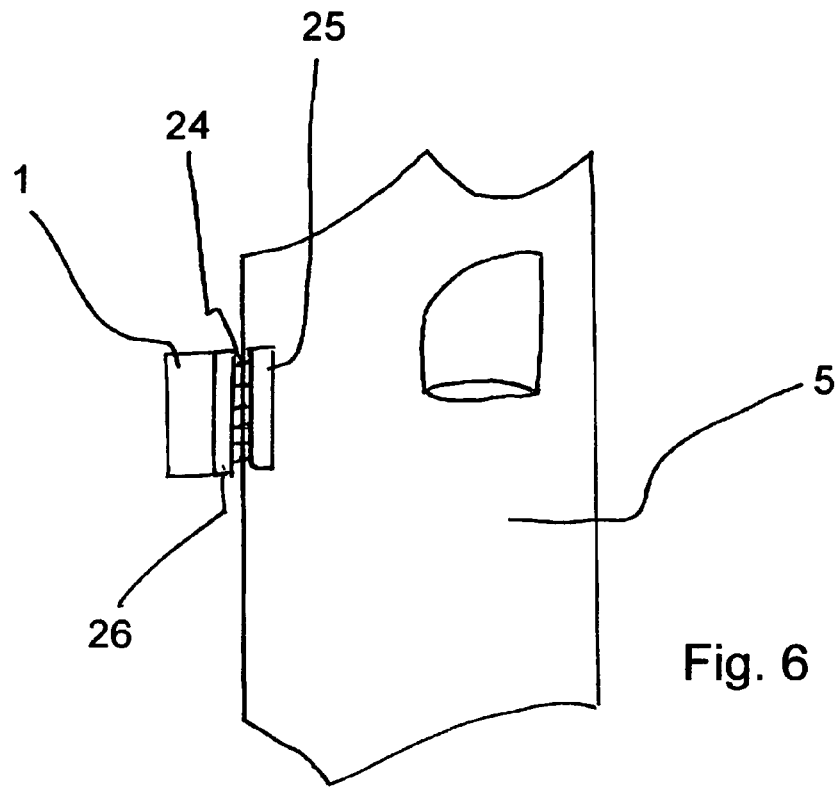
FIG. 6 is a view of the clothing accessory in accordance with a further embodiment of the invention.

In accordance with another feature of the present invention shown in FIGS. 3-7 the clothing accessory 1 can be arranged on an outer surface of an element of clothing 5, for example being connected to the latter, in particular to the pocket 6, by a clip 7; being suspended on a necklace 8; or as shown in FIG. 6 attached to clothing via a magnet clip attachment comprised of two parts: a magnet attachment 25 that is inserted behind the clothing 5 and a clip 26 that attaches to the clothing accessory 1 that is placed on the front of the clothing 5 and subsequently gripped by the magnet bonding 24 to the magnet attachment 25 behind the clothing 5. In order to fit different clothing and apparel designs, fabrics and/or materials, a plurality of clothing accessory pieces 2 can be provided, each having a different face design 3 that can correspond to the face design of the element of clothing 5. As an example, it can be seen from FIGS. 1, 3 and 5 that both the face of the element of clothing 5 and of the clothing accessory piece 2 have a square design. Each clothing accessory piece 2 has an opening 9 for the objective of the recording camera.

Figure 7:
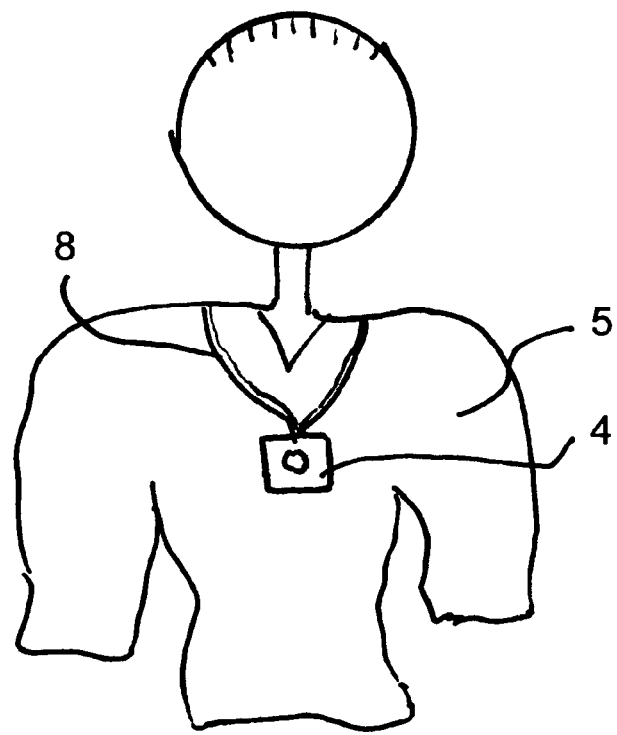
FIGS. 7, 8, 9, 10, 11, 12 and 13 are views showing other embodiments of the clothing accessory in accordance with the invention.
Figure 8:
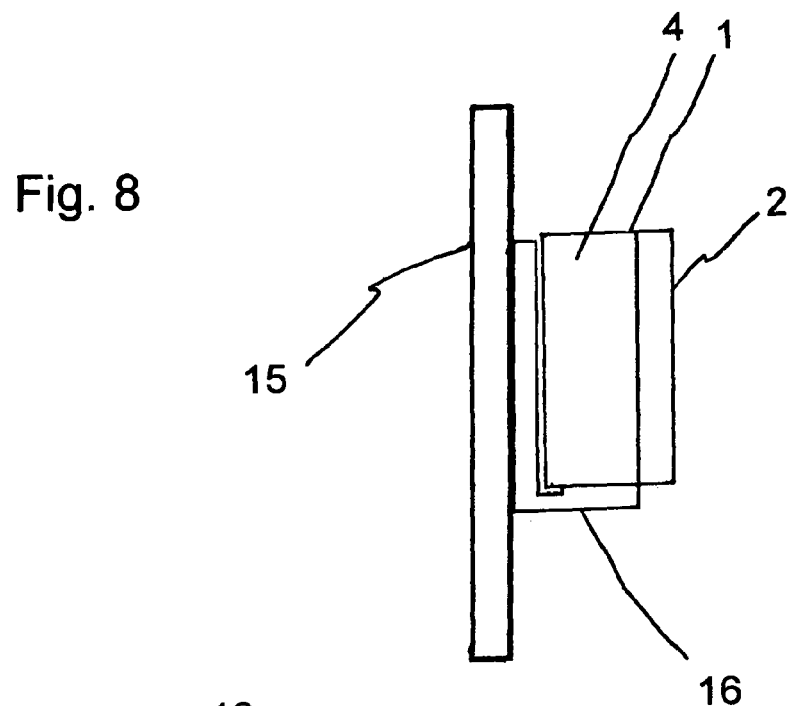
Figure 9:
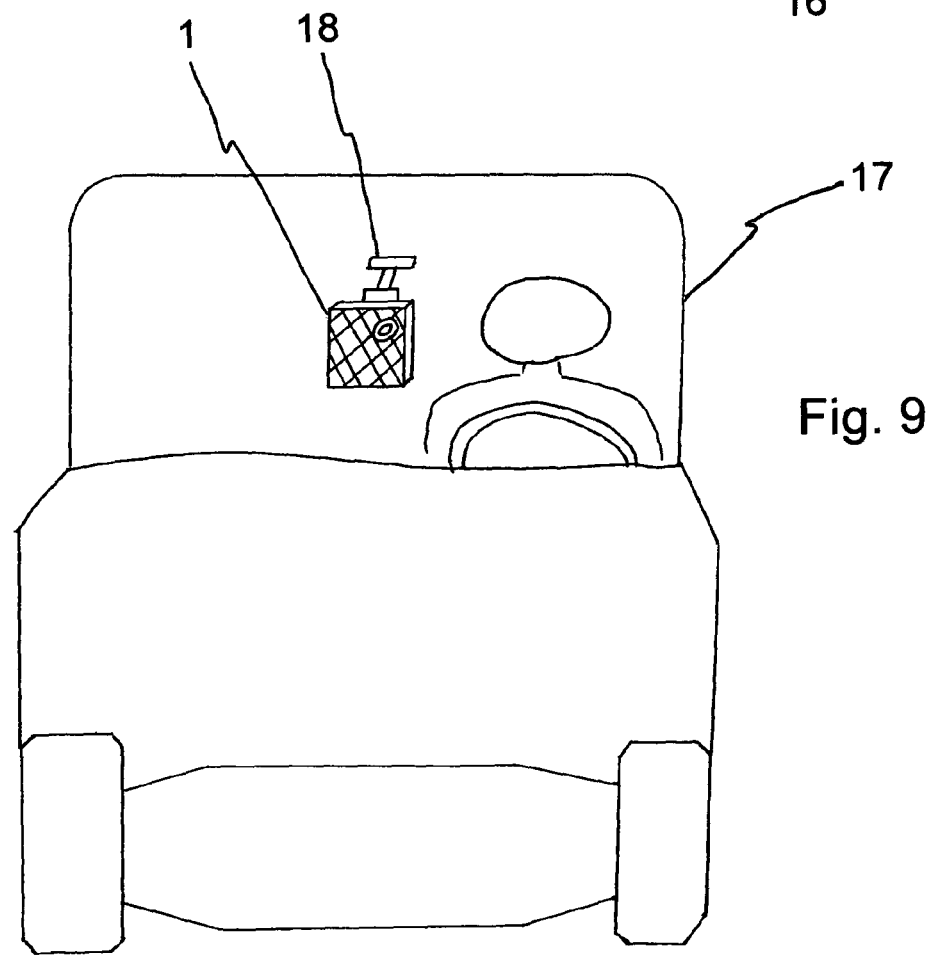

It is shown in FIG. 7 that the recording camera 4 can be suspended on a necklace or string 8 on the front surface of the element of clothing 5, and also can be covered by the clothing accessory piece 2 with a design which matches the design of the element of clothing 5.

The recording camera 4 can be constructed to carry out different types of photography and video recording with or without an audio recording. In particular it can carry out an automated photography, for example from 1 to 120 seconds delay with or without audio recording. It can also carry out a video recording to record during a certain time, or to record over a certain number of periods. These camera functions can be instructed by the software application on a wireless remotely operating device, for example on a cellphone, a smartphone and the like.

As shown in FIG. 2 the camera is constructed to include a touch sensor 21 to allow a user to tap the camera to perform photography and/or videography. The user can tap the clothing accessory 1, with the built-in camera 4, to snap a photo. Alternately the user can tap the clothing accessory 1, with the built-in camera 4, to "retro-save" previous events that have occurred. "Retro-save" means that the camera 4 only stores in its memory 13 the previous duration of video recording upon being tapped by the user. The user can customize the duration of the video recording the camera should store. Therefore as an example, the user can set the camera 4 to only store in its memory 13 the last several minutes of action upon tapping the camera. These camera functions can be instructed by the user with the software application on a wireless remotely operating device 12, for example on a smartphone, tablet and the like.

As shown in FIG. 2 the recording camera 4 can be provided with a motion detecting element 10. It is constructed so that it detects a motion in the vicinity of the camera and therefore of the user, and consequently activate the recording camera 4 automatically, just in response to the motion detection.

The recording camera 4 has a control or activating element 11 formed, for example, as a control button, with which the user operates to carry out the above mentioned recording processes carried out by the camera. The control or activating element 11 can also activate the recording camera to carry out making a plurality of photos and/or videos.

While the recording process can be selected and activated directly on the recording camera 4 by the control or activating element 11, in accordance with another advantageous feature of the present invention the recording camera 4 can be constructed as wirelessly operating recording camera, and a remotely operating control device 12 can be provided and/or used for remotely operating the recording camera for carrying out by the latter all desired recording processes. The remotely operating control device 12 can be formed as any correspondingly constructed electronic device, such as a remote controller, a smartphone, tablet, and the like, additionally capable of previewing in real time with a software application what the camera is viewing and/or recording.

In accordance with a still important and highly advantageous feature of the present invention the recording camera 4 and/or the remotely controlling device 12 can be constructed as can operated so that the recorded photos, video images and/or audio messages can be stored in a memory 13 of the recording camera 4, or can be transferred to the remotely operating control device 12 and stored in a memory 14 of the latter, or both for a subsequent retrieval, for example for viewing, transferring elsewhere, copying, etc.

Furthermore, the recording camera 4 can be constructed so that it simultaneously carries out a photography recording during a video recording, and it can be remotely controlled by the remotely controlling device wirelessly, to store, exchange and reproduce after the storing the photo and video images recorded by the recording camera 4.

Figure 10:
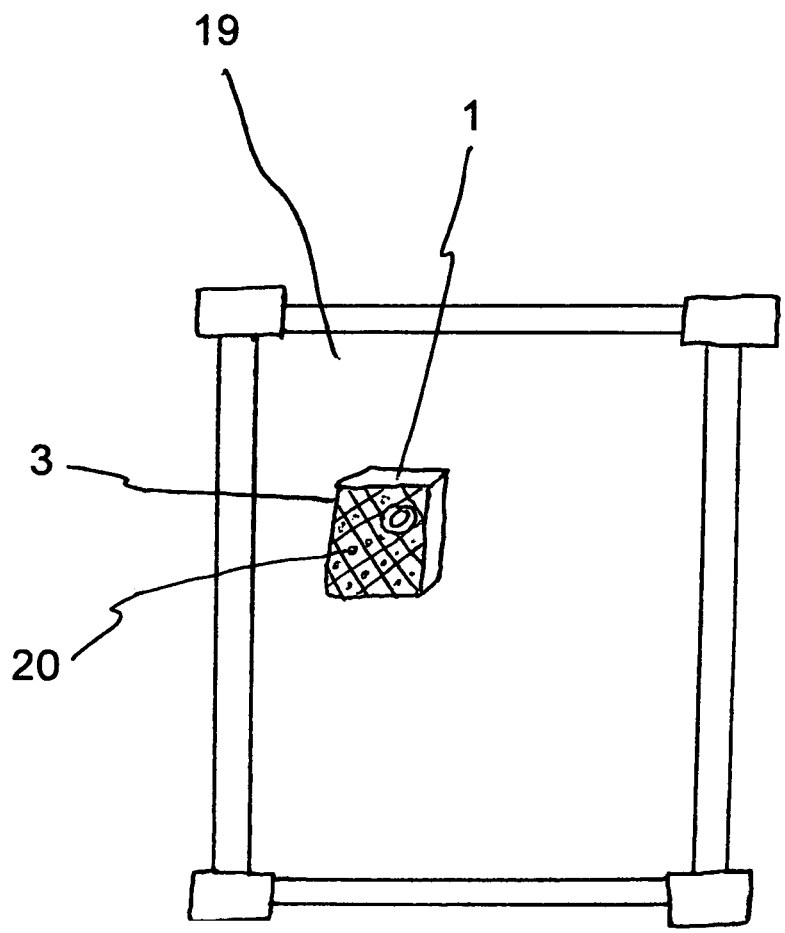
Figure 11:
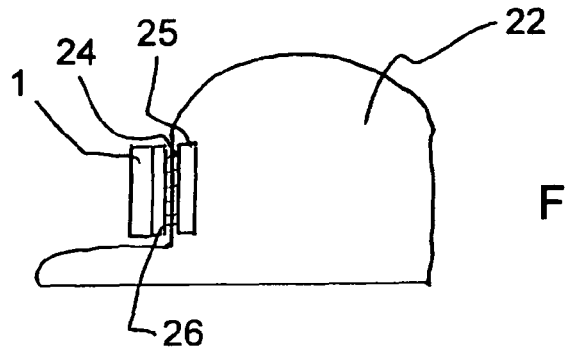
Figure 12:
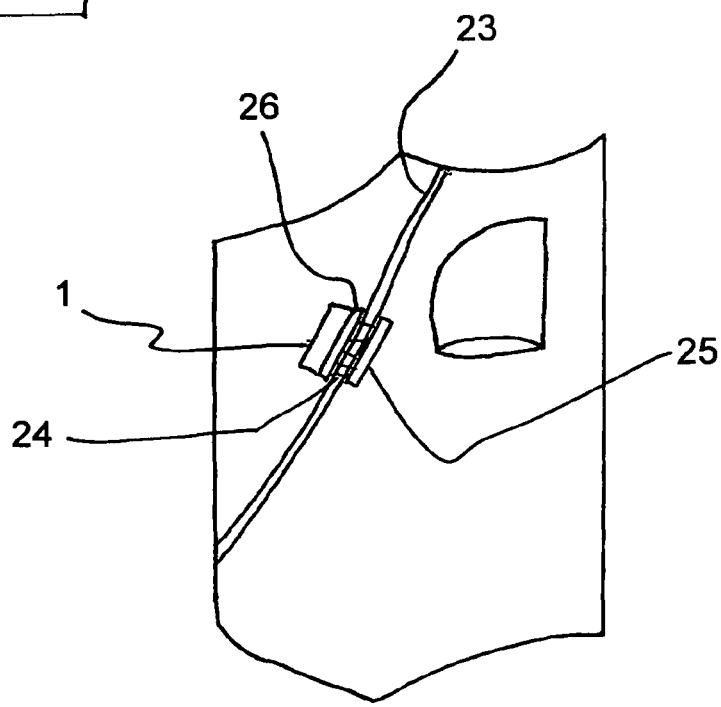
Figure 13:
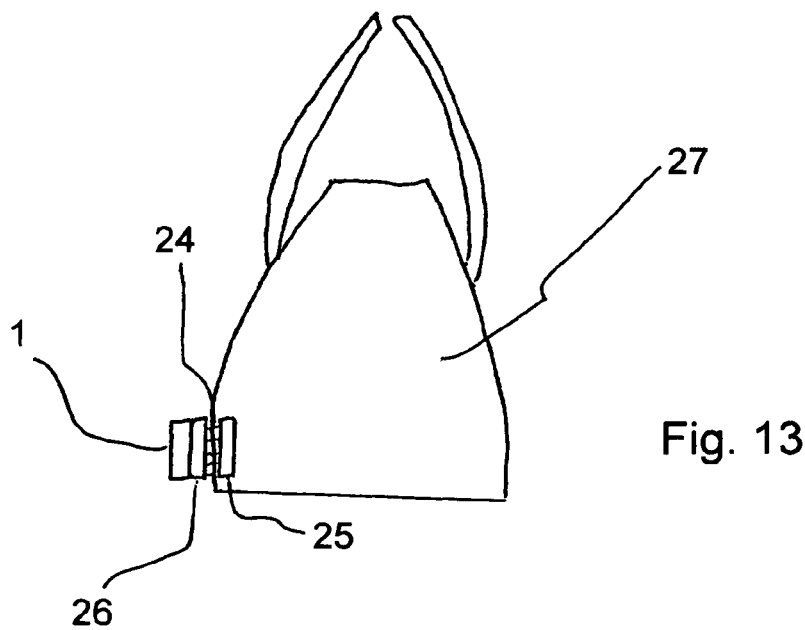

As shown in FIGS. 8, 9, 10, 11, 12 and 13 the clothing accessory 1 can also be attached to different objects and/or surfaces, such as, but not limited to, walls 15, windshields 17, windows 19, and/or hats 22, straps 23, and handbags 27. This is accomplished by utilizing different clips 16, mounts 18, or adhesives 20 depending on the surface. FIG. 10 shows the clothing accessory 1 attached to a window 19 with a clothing accessory piece 2 that includes adhesive 20 on the front face 3. FIG. 11 shows the clothing accessory 1 attached to a hat 22 that can be accomplished utilizing the magnet attachment 25 inserted inside the hat 22 and magnet clip attachment 26 attached to clothing accessory 1 on the front of the hat and subsequently gripped by the magnet bonding 24 to the magnet attachment 25 behind the hat 22 . FIG. 12 shows the clothing accessory 1 attached to a body wearable strap 23 that can be accomplished utilizing the magnet attachment 25 inserted on the inside of the wearable strap 23 magnet clip attachment 26 attached to clothing accessory 1 on the front of the strap and subsequently gripped by the magnet bonding 24 to the magnet attachment 25 behind the strap 22. FIG. 13 shows the clothing accessory 1 attached to a handbag 27 that can be accomplished utilizing the magnet attachment.

Figure 14:
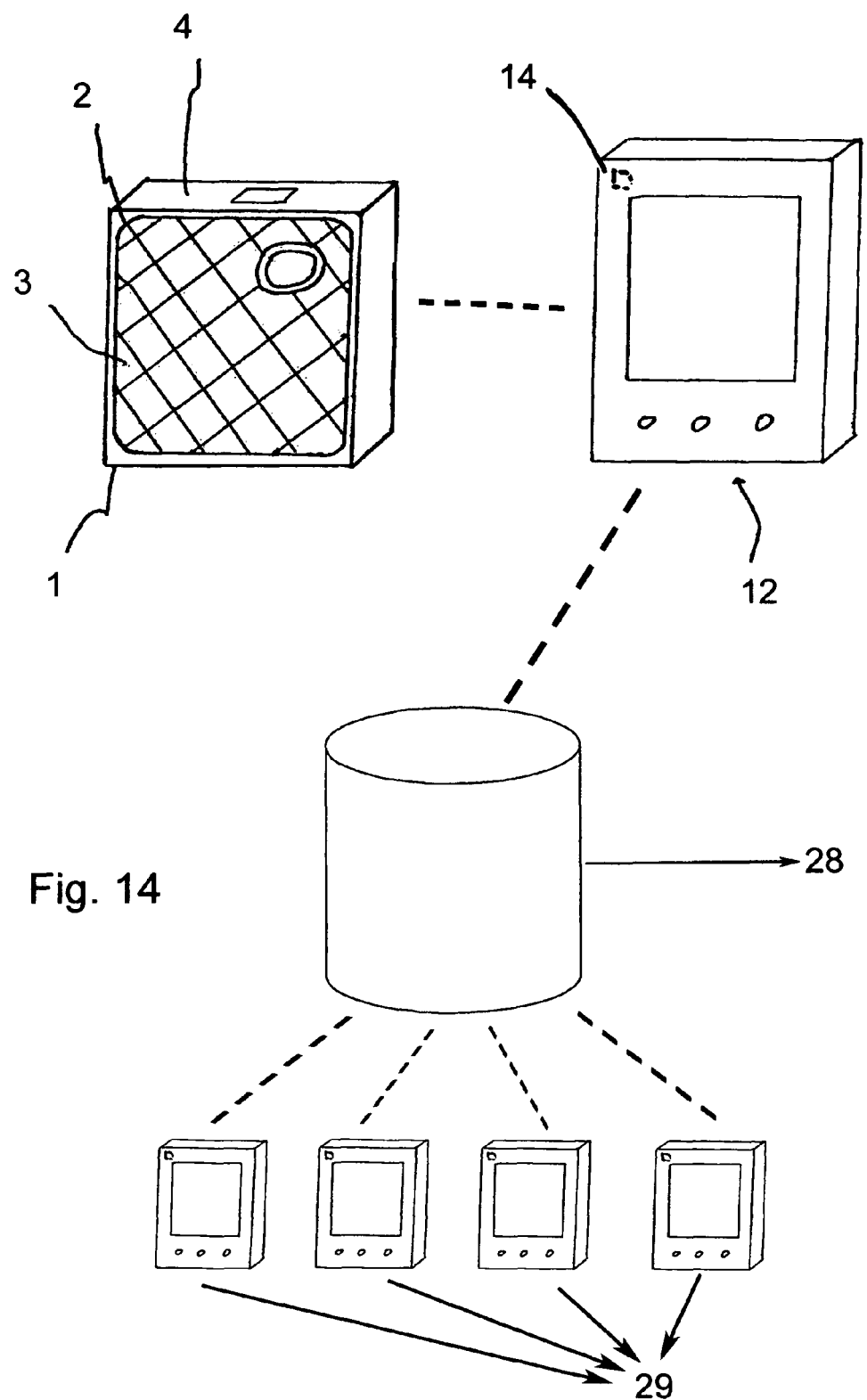
FIG. 14 is a view showing the clothing accessory according to the invention, and a remotely operating control device wirelessly connected to a data server.

In accordance with a still important and highly advantageous feature of the present invention, as shown in FIG. 14, the recording camera 4 can connect wirelessly to a data server 28 through its wireless connectivity to the remotely controlling device 12, wherein the recorded photos, videos images and/or audio messages can be transferred wirelessly from the recording camera 4 to the data server 28 by way of the remotely controlling device 12 itself wirelessly connected to the data server 28, and stored, exported, streamed, etc onto the data server 28, for subsequent retrieval, transferring elsewhere, or viewing from other smart wireless devices 29, such as smartphones, tablets and the like, connected to the server.

Furthermore, the recording camera 4 can be constructed so that it can simultaneously carry out a video recording while transferring and streaming said video recording to the data server 28, allowing for said video recording to be viewed remotely in real time on the display screens of other smart devices 29 wirelessly connected to the server 28, such as smartphones, tablets and the like.

The invention is not limited to the details shown since various modifications and structural changes are possible without departing in any way from the spirit of the invention.

What is desired to be protected by Letters Patent is set forth in particular in the appended claims.

The invention claimed is:

1. A clothing accessory that contains a built in recording camera, wherein said recording camera can carry out photo and video recording processes while being associated with said element of clothing accessory, where said camera can operate wirelessly capable of transmitting data wirelessly from said camera to a remotely operating wireless device such as a smartphone, tablet and other like portable devices, and where said recording camera has no display, and said remotely operating device such as a smartphone, tablet and other like portable devices may be utilized to view on its display what said recording camera is recording in real time, wherein said camera has a bunt in touch sensor allowing to physically tap the camera to snap a photo or record a video, wherein said photo and/or video recording can be stored in the internal memory of the said camera upon tapping, wherein said camera is capable of storing to its internal memory the video recordings of previous events that have occurred upon user tapping the said camera, referred to as retro saved video recordings, wherein the duration of the said retro saved video recordings can be changed by the user with a remotely operating device such as a smartphone, tablet and other like portable devices.

2. A clothing accessory as defined in claim 1, wherein said clothing accessory can be provided with at least one cover piece of any one of multiple designs, sizes, materials or shapes to adorn said clothing accessory, and said cover piece can be attachable to said clothing accessory by adhesive, wrapped around, and/or clipped on.

3. A clothing accessory as defined in claim 2, wherein said element of clothing accessory can be worn on clothing with various clips, including a magnet clip that attaches from the inside of the clothing to the clothing accessory on the outside of the clothing by way of magnetizing.

4. A clothing accessory as defined in claim 2, wherein said element of clothing accessory can be worn around the neck by attaching to a lanyard or necklace of any material; and/or can be attached to other objects and surfaces, such as, but not limited to, walls, windshields, windows, hats , straps and handbags, with various mounts, clips and/or adhesives.

5. A clothing accessory as defined in claim 1, wherein said element of clothing accessory can be worn on clothing with various clips, including a magnet clip that attaches from the inside of the clothing to the clothing accessory on the outside of the clothing by way of magnetizing.

6. A clothing accessory as defined in claim 1, wherein said element of clothing accessory can be worn around the neck by attaching to a lanyard or necklace of any material; and/or can be attached to other objects and surfaces such as, but not limited to, walls, windshields, windows, hats, straps and handbags, with various mounts, clips and/or adhesives.

7. A clothing accessory that contains a but in recording camera, wherein said recording camera can carry out photo and video recording processes while being associated with said element of clothing accessory, where said camera can operate wirelessly capable of transmitting data wirelessly from said camera to a remotely operating wireless device such as a smartphone, tablet and other like portable devices, and where said recording camera has no display, and said remotely operating device such as a smartphone, tablet and other like portable devices may be utilized to view on its display what said recording camera is recording in real time, wherein said clothing accessory can be provided with at least one cover piece of any one of multiple designs, sizes, materials or shapes to adorn said clothing accessory, and said cover piece can be attachable to said clothing accessory by adhesive, wrapped around, and/or clipped on, wherein said camera has a built in touch sensor allowing to physically tap the camera to snap a photo or record a video, wherein said photo and/or video recording can be stored in the internal memory of the said camera upon tapping, wherein said camera is constructed to carry out recordings selected from the group consisting of an audio recording, a video recording, an automated photography with or without audio recording, a video recording to record over a certain time or over a number of periods, to make a plurality of photos, and combinations thereof, and where said recording camera is also constructed to carry out photography recording during video recording.

* * * * *